United States Patent [19]

Langumier et al.

[11] Patent Number: 5,256,712

[45] Date of Patent: Oct. 26, 1993

[54] PROCESS FOR OBTAINING BITUMENS CONTAINING AT LEAST ONE ELASTOMER AND PRODUCTS OBTAINED

[75] Inventors: Georges Langumier, Saint Germain en l'Hay; Pierre Montmory, Fontenay le Fleury, both of France

[73] Assignee: Colas, Societe Ainonyme, Paris, France

[21] Appl. No.: 897,612

[22] Filed: Jun. 10, 1992

Related U.S. Application Data

[63] Continuation of Ser. No. 341,374, Apr. 21, 1989, abandoned.

[30] Foreign Application Priority Data

Apr. 25, 1988 [FR] France ............................... 88 05478

[51] Int. Cl.[5] .............................................. C08L 95/00
[52] U.S. Cl. ........................................ 524/71; 524/64; 523/352
[58] Field of Search ...................... 523/352; 524/64, 71

[56] References Cited

U.S. PATENT DOCUMENTS 4,755,545 7/1988 Lalwani ................................ 524/64
4,837,252 6/1989 Seguin et al. ....................... 523/351

FOREIGN PATENT DOCUMENTS

| | | |
|---|---|---|
| 895372 | 3/1972 | Canada . |
| 2017264 | 5/1970 | France . |
| 2018045 | 5/1970 | France . |
| 2424942 | 1/1980 | France . |
| 1201135 | 8/1970 | United Kingdom . |
| 1284726 | 8/1972 | United Kingdom . |

*Primary Examiner*—Paul R. Michl
*Assistant Examiner*—Edward Cain
*Attorney, Agent, or Firm*—Frost & Jacobs

[57] ABSTRACT

This process for obtaining bitumens containing at least one elastomer comprises two steps according to which, in the first step, a homogeneous dispersion is prepared consisting of elastomer and of selected bitumen containing a low percentage of saturated products and of asphaltenes by blending the said elastomer and the said bitumen until a master solution containing a high concentration of elastomer is obtained and, in the second step, the said master solution is diluted with a roadmaking bitumen until a homogeneous product is obtained in the form of an elastomeric bitumen.

16 Claims, No Drawings

PROCESS FOR OBTAINING BITUMENS CONTAINING AT LEAST ONE ELASTOMER AND PRODUCTS OBTAINED This is a continuation of application Ser. No. 07/341,374, filed Apr. 21, 1989, now abandoned.

FIELD OF THE INVENTION

The present invention relates to a process for obtaining bitumens containing at least one elastomer or polymer and the products obtained.

PRIOR ART

At the present time it is known to prepare numerous mixtures of bitumens and of elastomers. The elastomers have been introduced into bitumen compositions because they contribute plasticity properties which are frequently useful when the bitumen-based mixtures are applied.

Various categories of elastomers or of polymers have been employed, for example copolymers of ethylene and of vinyl acetate, copolymers of butadiene and of styrene and elastomers of the styrene-butadiene-styrene type.

The styrene-butadiene-styrene bitumens exhibit a highly advantageous characteristic, but their manufacture requires high technology. One of the reasons is that the styrene-butadiene-styrene lattice must be structured in a specific way in the bitumen. The processes for obtaining styrene-butadiene-styrene (SBS) bitumens according to the prior art involve the use of compatible bitumens of particular ranges which are mixed with the styrene-butadiene-styrene in one step. More precisely, according to the current processes for manufacturing styrene-butadiene-styrene bitumens of the prior art, it is necessary to employ a so-called compatible bitumen with a low content of asphaltenes and a high content of aromatics. As a person skilled in the art knows perfectly well, these bitumens are not produced in all refineries, whatever the refining process.

The chief difficulties encountered in the manufacture and in obtaining styrene-butadiene-styrene bitumens are the following: as indicated above, so-called compatible special bitumens must be employed, since only these make it possible to obtain a homogeneous mixture and to avoid the separation of the elastomer on storage; furthermore, there is a risk that a continuous polymeric phase will not be obtained.

FR-A-2,424,942 describes a process for obtaining an intermediate product consisting of styrene-butadiene-styrene and of a compatible bitumen.

FR-A-2,018,045 has as its subject matter a bituminous composition containing a filler for packing joints. The essential ingredient is wax-free bitumen with a filler and a block copolymer.

FR-A-2,017,264 describes compositions based on bitumens and on polymers in which the bituminous constituent is not a conventional roadmaking bitumen.

So far as is known, it is not possible to obtain, using the known processes of the prior art, styrene-butadiene-styrene bitumens based on roadmaking bitumens, that is to say bitumens containing a significant percentage of asphaltenes.

There is therefore a need to obtain styrene-butadiene-styrene bitumens which make it possible to employ conventional roadmaking bitumens in a significant proportion, whereas the processes according to the prior art have never permitted such roadmaking bitumens to be employed in obtaining SBS bitumens.

SUMMARY OF THE INVENTION

The research which has been carried out has made it possible to produce bitumens containing at least one elastomer, particularly styrene-butadiene-styrene bitumen, in which the bitumen is largely roadmaking bitumen.

Besides being novel insofar as the manufacture of styrene-butadiene-styrene bitumens is concerned, the process according to the present invention is also advantageous because it improves the characteristics of the products obtained.

The process of the present invention is also characterized by being highly reliable, which was not the case with the processes of the prior art.

The present invention therefore proposes a process which makes it possible to employ conventional roadmaking bitumen in a very high proportion and which permits the risk of demixing to be eliminated. It therefore makes storage easier.

The research undertaken by the Applicant Company has made it possible to show that a styrene-butadiene-styrene bitumen having very good characteristics in all fields could be obtained by employing predominantly a conventional roadmaking bitumen, on condition of carrying out a two-step manufacture, during which, in a first step, a master solution containing a high concentration of styrene-butadiene-styrene is prepared with a carefully selected bitumen and, in a second step, the said master solution is diluted with a conventional roadmaking bitumen.

The process according to the present invention offers two very great advantages, namely the use of a considerable proportion of a locally available conventional roadmaking bitumen and the provision of an elastomeric binder which is stable to storage.

The present invention additionally makes it possible to improve the cold behaviour and adhesiveness characteristics.

DESCRIPTION OF THE PREFERRED EMBODIMENTS

The present invention proposes, therefore, a process for obtaining bitumens containing at least one elastomer, which process comprises two steps according to which, in the first step, an homogeneous dispersion consisting of elastomer and of a selected bitumen with a low percentage of saturated products and of asphaltenes is prepared by blending the said elastomer and the said bitumen until a master solution containing a high concentration of elastomer is obtained and, in the second step, the said master solution is diluted with a roadmaking bitumen until a homogeneous product is obtained in the form of an elastomeric bitumen.

According to a first embodiment, the starting material is a premilled, sufficiently fine elastomer, which is mixed with the selected bitumen, and this leads to a master solution which can be directly employed in the second step with a view to its being diluted with the roadmaking bitumen.

In an alternate form, the starting material is a relatively coarse elastomer which is directly mixed with the selected bitumen, after which the mixture obtained is subjected to milling in a wet medium to obtain the master solution which can be employed in the second step.

Any of the elastomers which are suitable for being combined with bitumens may be employed as an elastomer in the process of the invention, elastomers based on styrene-butadiene-styrene (SBS) being greatly preferred. An elastomer of this type is advantageous because of its hot and cold properties; in fact, it is thermoplastic at a high temperature and resistant to cold.

The present invention also relates to the characteristics which are considered hereinafter in isolation or in accordance with any of their technically possible combinations:
the elastomer is styrene-butadiene-styrene (SBS),
the styrene-butadiene-styrene is of a linear type,
the styrene-butadiene-styrene is in the form of powder, of grains or of granules,
substantially from 10 to 20% of styrene-butadiene-styrene is introduced,
the selected bitumen contains less than 6% of saturated products and less than 7% of asphaltenes and has a colloidal instability value which is lower than 0.17,
the roadmaking bitumen contains more than 8% of asphaltenes and has a colloidal instability value of between 0.2 and 0.6,
at least 30% of roadmaking bitumen is incorporated during the second step.

In another aspect, the present invention also has as its subject matter new products, namely elastomeric bitumens, especially styrene-butadiene-styrene (SBS) bitumens, comprising, by weight, at least 30% of roadmaking bitumen and at least 3% of elastomer, the remainder consisting of selected bitumen.

According to an advantageous embodiment, the bitumens of the invention contain up to 80% and generally more than 50% by weight of roadmaking bitumen.

According to other characteristics, considered in isolation or in combination:
the elastomeric bitumens have a penetration at 25° C. of between 40 and 200 tenths of an mm,
the elastomeric bitumens have a ring-and-ball temperature of above 60° C.,
the bitumens have a Pfeiffer penetrability value of more than 3.5,
the bitumens have a Fraass point below −20° C.

The present invention will be illustrated, without being limited, by the following examples, where all the parts and proportions are expressed by weight, unless stated otherwise.

EXAMPLE 1

Milled styrene-butadiene-styrene is introduced into a blender with a vertical axis containing selected bitumen, that is to say a bitumen containing less than 7% of asphaltenes and having a colloidal instability value of less than 0.17 and also containing less than 6% of saturated products. The styrene-butadiene-styrene represents 10 to 20% of the master solution. In a second step, the product obtained according to step 1 above is diluted with a conventional roadmaking bitumen to have a styrene-butadiene-styrene bitumen containing at least 3% of styrene-butadiene-styrene.

EXAMPLE 2

Granules of styrene-butadiene-styrene approximately 3 to 4 mm in diameter are introduced into a wet-medium grinder and are mixed with a selected bitumen, that is to say with a bitumen containing less than 7% of asphaltenes and less than 6% of saturated products and having a colloidal instability value of less than 0.17. When a homogeneous dispersion is obtained, milling is carried out in order to obtain a master solution. In a second step, the product according to step 1 above is diluted with a conventional roadmaking bitumen, also to arrive in the final styrene-butadiene-styrene bitumen at a content of at least 3% of styrene-butadiene-styrene.

The colloidal instability value $$I_c = (A+S)/(R+C)$$

is calculated with A = % of asphaltenes, S = % of saturated constituents, R = % of resins and C = % of cyclic constituents.

EXAMPLE 3

The comparison of the properties of two products according to the present invention (3 and 4) with two controls based on roadmaking bitumen (1 and 2) containing 5% of styrene-butadiene-styrene is shown below in tabular form.

|  |  | Penetration* | Ring-and-ball temperature** | Penetrability value*** | Fraass point**** |
|---|---|---|---|---|---|
| (1) Control with 5% of SBS | M | 103 | 75 | +6 | −28° C. |
|  | T | 130 |  |  | 78 |
|  | B | 64 | +25° C. |  |  |
|  |  |  | 53 |  |  |
| (2) Control with 5% SBS | M | 89 | 66 | +3.8 | −21° C. |
|  | T | 134 |  |  | 79 |
|  | B | 76 | 48 +31° C. |  |  |
| (3) Product of the invention | M | 91 | 72 | +5 | −20° C. |
|  | T | 118 |  |  | 70 |
|  | B | 119 |  |  | 69 + 1° C. |
| (4) Product of the invention | M | 82 | 74 | +5 | −24° C. |
|  | T | 91 |  |  | 79 |
|  | B | 84 |  |  | 0° C. |

M = manufacture
T = sample taken from the top of the test tube after the sedimentation test
B = taken from the bottom of the test tube after the sedimentation test.
*Measured according to NFT standard 66004
**Measured according to NFT standard 66008
***Measured according to the Pfeiffer standard
****Measured according to the draft operating procedure RLB7

To evaluate the storage stability of the products obtained a test is employed according to which the sedimentation of the bitumen is characterized. A test of this kind consists in subjecting the bitumen to a temperature of approximately 160° C. for 96 hours.

At the end of this time the viscosity $\eta_1$ of the upper portion and the viscosity $\eta_2$ of the lower portion are measured.

The ratio $\Delta\eta/\eta$ where $\Delta\eta = \eta_2 - \eta_1$ and $\eta(\eta_1 + \eta_2)/\eta_2$ characterizes the sedimentation of the bitumen.

If $\Delta\eta/\eta$ is positive, sedimentation occurs and if $\Delta\eta/\eta$ is negative, separation takes place.

As can be seen in the table above, the controls 1 and 2, manufactured with a roadmaking bitumen without employing the process of the invention, give rise to a strong sedimentation after storage for four days at 160° C.

This sedimentation is characterized by the difference in the ring-and-ball temperatures which is measured on samples taken from the top and from the bottom of the test tube.

In contrast, products 3 and 4, manufactured by employing the process of the invention, do not sediment, because the difference in the ring-and-ball temperatures is negligible (smaller than the reproducibility of the test which is of 2° C.).

By way of guidance, the elastomeric bitumen 3 according to the invention contains 65% of roadmaking bitumen which has been used to manufacture the control 2.

It is important to note that in the present invention it is possible to have a product containing up to 80% of roadmaking bitumen. In the prior art it was not possible to employ roadmaking bitumen because the elastomeric bitumen manufactured with roadmaking bitumen (see controls 1 and 2) separated. It was therefore necessary to employ a compatible bitumen. It should also be noted that in the present invention the expression "roadmaking bitumen" also includes mixtures based on roadmaking bitumen.

In Example 3 the ring-and-ball temperature has been employed as an index for characterizing the viscosity of the bitumen in the top portion and the bottom portion of the test tube. Sedimentation takes place when the ring-and-ball temperatures are significantly different. Examination of the results of Example 3 shows that the differences +25° C. and +31° C. in the case of the controls 1 and 2 are significantly different, whereas they are not such in the case of the products 3 and 4 according to the invention.

The process according to the present invention offers a major saving on an industrial scale, because it makes it possible to employ a large quantity of locally available roadmaking bitumens that could not be employed with the processes according to the prior art, which made it necessary to obtain compatible bitumens from far away for the entire production.

What is claimed is:

1. A process for obtaining storage stable bitumens containing at least one elastomer, which process comprises two steps, according to which, in the first step, a homogeneous dispersion comprising said elastomer and a selected bitumen, said selected bitumen containing less than about 6% of saturated products and less than about 7% asphaltenes, is prepared by blending said elastomer with said selected bitumen until a master solution is obtained, and, in the second step, said master solution is diluted with a roadmaking bitumen, said roadmaking bitumen containing greater than about 8% by weight asphaltenes, until a homogeneous product is obtained in the form of a storage stable elastomeric bitumen.

2. A process according to claim 1, wherein said elastomer is present in said master solution at a concentration of between 10% and 20% by weight.

3. A process according to claim 2, wherein said elastomer is a premilled, fine elastomer, having a particle size in the range of between 3 and 4 millimeters in diameter.

4. A process according to claim 2, wherein the starting material is a coarse elastomer, which is directly mixed with the selected bitumen, after which the mixture obtained is subjected to milling in a wet medium to obtain the master solution which can be employed in the second step.

5. A process according to claim 2, wherein said elastomer is styrene-butadiene-styrene.

6. A process according to claim 2, wherein said elastomer is styrene-butadiene-styrene in a form selected from the group consisting of powder, grains and granules.

7. A process according to claim 5, wherein said elastomer is a linear styrene-butadiene-styrene.

8. A process according to claim 2, wherein said selected bitumen is a bitumen having a colloidal instability value below 0.17.

9. A process according to claim 2, wherein said roadmaking bitumen has a colloidal instability value of between 0.2 and 0.6.

10. A process according to claim 2, wherein said roadmaking bitumen is incorporated into said elastomeric bitumen during said second step such that said roadmaking bitumen comprises at least 30% of said elastomeric bitumen.

11. Storage stable elastomeric bitumens, comprising, by weight, at least 30% of a roadmaking bitumen and at least 3% of a styrene-butadiene-styrene elastomer, and a selected bitumen, said selected bitumen containing less than about 6% of saturated products and less than about 7% asphaltenes.

12. Elastomeric bitumens according to claim 11, wherein said roadmaking bitumen is present in an amount greater than 50% by weight.

13. Elastomeric bitumens according to claim 11, which have a penetration at 25° C. of between 40 and 200 tenths of an mm.

14. Elastomeric bitumens according to claim 11, which have a ring-and-ball temperature of above 60° C.

15. Elastomeric bitumens according to claim 11, which have a Pfeiffer penetrability value of more than 3.5.

16. Bitumens according to claim 11, which have a Fraass point below −20° C.

* * * * *